(12) United States Patent
Uchino et al.

(10) Patent No.: US 11,706,798 B2
(45) Date of Patent: *Jul. 18, 2023

(54) USER APPARATUS AND BASE STATION APPARATUS

(71) Applicant: NTT DOCOMO, INC., Tokyo (JP)

(72) Inventors: Tooru Uchino, Tokyo (JP); Tomoya Ohara, Tokyo (JP); Hideaki Takahashi, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 77 days.

This patent is subject to a terminal disclaimer.

(21) Appl. No.: 16/969,641

(22) PCT Filed: Feb. 20, 2018

(86) PCT No.: PCT/JP2018/006080
§ 371 (c)(1),
(2) Date: Aug. 13, 2020

(87) PCT Pub. No.: WO2019/163006
PCT Pub. Date: Aug. 29, 2019

(65) Prior Publication Data
US 2020/0404703 A1    Dec. 24, 2020

(51) Int. Cl.
*H04W 74/04* (2009.01)
*H04W 72/044* (2023.01)
*H04W 72/23* (2023.01)

(52) U.S. Cl.
CPC ......... *H04W 74/04* (2013.01); *H04W 72/044* (2013.01); *H04W 72/23* (2023.01)

(58) Field of Classification Search
CPC . H04W 72/042; H04W 72/044; H04W 74/04; H04W 74/0833
See application file for complete search history.

(56) References Cited

U.S. PATENT DOCUMENTS 8,537,739 B1 *  9/2013  Dinan ................... H04W 72/30
                                                          370/312
8,565,142 B1 * 10/2013  Dinan ................. H04W 74/006
                                                          370/312

(Continued)

FOREIGN PATENT DOCUMENTS

AU    2015210884 A1 *  8/2016  .......... H04W 52/146
CN     104247303 B  *  6/2019  .......... H04L 1/1861

(Continued)

OTHER PUBLICATIONS

3rd Generation Partnership Project (3GPP), Medium Access Control (MAC) Protocol Specification, Dec. 2017, 3GPP, 3GPP Technical Specification (TS) 36.321, Version 15.0.0, pp. 1-8, 18-30, 98, 103-109 (Year: 2017).*

(Continued)

*Primary Examiner* — Eric Nowlin
(74) *Attorney, Agent, or Firm* — Osha Bergman Watanabe & Burton LLP

(57) ABSTRACT

A user apparatus receives an instruction to execute a random access procedure from a base station apparatus and includes a reception unit that receives first information specifying an available random access channel from the base station apparatus; a control unit that identifies, on the basis of the first information, a resource of the available random access channel in a time domain or a frequency domain; and a transmission unit that transmits a random access preamble using the identified resource.

3 Claims, 11 Drawing Sheets

(56) References Cited

U.S. PATENT DOCUMENTS

| | | | |
|---|---|---|---|
| 8,570,902 B2* | 10/2013 | Du | H04W 74/008 370/254 |
| 9,414,409 B2* | 8/2016 | Kim | H04W 72/0446 |
| 9,497,782 B2* | 11/2016 | Kim | H04W 72/0413 |
| 9,521,692 B2* | 12/2016 | Kim | H04W 36/32 |
| 9,603,048 B2* | 3/2017 | Pelletier | H04W 28/0284 |
| 9,603,168 B2* | 3/2017 | Kim | H04W 72/0406 |
| 9,814,075 B2* | 11/2017 | Kim | H04W 48/00 |
| 9,980,295 B2* | 5/2018 | Pelletier | H04L 1/0072 |
| 10,111,257 B2* | 10/2018 | Kim | H04B 7/26 |
| 10,129,824 B2* | 11/2018 | Kim | H04W 8/24 |
| 10,314,079 B2* | 6/2019 | Kim | H04W 8/06 |
| 10,420,147 B2* | 9/2019 | Dinan | H04W 74/0833 |
| 2012/0063393 A1* | 3/2012 | Du | H04W 74/008 370/329 |
| 2013/0201960 A1* | 8/2013 | Kim | H04W 8/06 370/336 |
| 2013/0242730 A1* | 9/2013 | Pelletier | H04W 74/0833 370/230 |
| 2013/0242851 A1* | 9/2013 | Dinan | H04W 72/30 370/312 |
| 2014/0334371 A1* | 11/2014 | Kim | H04W 52/0229 370/311 |
| 2015/0043505 A1* | 2/2015 | Kim | H04W 36/32 370/329 |
| 2015/0063305 A1* | 3/2015 | Kim | H04W 72/0446 370/336 |
| 2015/0078286 A1* | 3/2015 | Kim | H04W 74/0833 370/329 |
| 2016/0029414 A1* | 1/2016 | Kim | H04W 36/0072 370/329 |
| 2016/0360479 A1* | 12/2016 | Kim | H04W 52/0229 |
| 2017/0006640 A1* | 1/2017 | Dinan | H04W 74/0833 |
| 2017/0135135 A1* | 5/2017 | Pelletier | H04L 1/0072 |
| 2017/0150530 A1* | 5/2017 | Kim | H04W 36/0072 |
| 2018/0077734 A1* | 3/2018 | Kim | H04L 1/188 |
| 2020/0344810 A1* | 10/2020 | Xiong | H04L 1/1861 |
| 2020/0404703 A1* | 12/2020 | Uchino | H04L 5/0053 |
| 2021/0037487 A1* | 2/2021 | Ohara | H04W 74/0833 |
| 2021/0352734 A1* | 11/2021 | Svedman | H04W 74/0841 |

FOREIGN PATENT DOCUMENTS

| | | | | |
|---|---|---|---|---|
| CN | 109842953 A | * | 6/2019 | H04W 74/08 |
| CN | 110267355 A | * | 9/2019 | H04L 1/1861 |
| EP | 2849357 A1 | * | 3/2015 | H04B 7/26 |
| EP | 3100535 B1 | * | 3/2019 | H04W 52/146 |
| EP | 2813008 B1 | * | 12/2020 | H04L 1/1861 |
| EP | 3780876 A1 | * | 2/2021 | H04L 1/1861 |
| EP | 2849357 B1 | * | 9/2021 | H04B 7/26 |
| EP | 3982580 A1 | * | 4/2022 | H04B 7/26 |
| KR | 20130090804 A | * | 8/2013 | |
| KR | 20130127367 A | * | 11/2013 | |
| KR | 102130375 B1 | * | 7/2020 | |
| KR | 102148335 B1 | * | 8/2020 | |
| WO | 2008/097023 A1 | | 8/2008 | |
| WO | WO-2013112021 A1 | * | 8/2013 | H04L 43/06 |
| WO | WO-2013119018 A1 | * | 8/2013 | H04L 1/1861 |
| WO | WO-2013168917 A1 | * | 11/2013 | H04B 7/26 |
| WO | WO-2019050316 A1 | * | 3/2019 | H04W 56/0015 |
| WO | WO-2021004337 A1 | * | 1/2021 | H04W 74/0833 |
| WO | WO-2021010751 A1 | * | 1/2021 | H04B 7/0626 |
| WO | WO-2021066697 A1 | * | 4/2021 | H04W 74/006 |

OTHER PUBLICATIONS

Extended European Search Report issued in counterpart European Application No. 18907254.9 dated Sep. 21, 2021 (9 pages).
Office Action issued in counterpart Japanese Application No. 2020-501887 dated Nov. 2, 2021 (5 pages).
Huawei, HiSilicon; "Remaining details of RACH Procedures"; 3GPP TSG RAN WG1 Meeting #92, R1-1801331; Athens, Greece, Feb. 26-Mar. 2, 2018 (5 pages).
Ericsson; "Signaling of random access parameters [M063]"; 3GPP TSG-RAN WG2 #101, R2-1803675; Athens, Greece, Feb. 26-Mar. 2, 2018 (10 pages).
International Search Report issued in Application No. PCT/JP2018/006080, dated May 15, 2018 (4 pages).
Written Opinion issued in International Application No. PCT/JP2018/006080, dated May 15, 2018 (4 pages).
3GPP TS 38.213 V15.0.0, Release 15; "3rd Generation Partnership Project; Technical Specification Group Radio Access Network; NR; Physical layer procedures for control;" Dec. 2017; Sophia Antipolis Valbonne, France (56 pages).
3GPP TS 38.321 V15.0.0, Release 15; "3rd Generation Partnership Project; Technical Specification Group Radio Access Network; NR; Medium Access Control (MAC) protocol specification;" Dec. 2017; Sophia Antipolis Valbonne, France (55 pages).
3GPP TSG RAN WG1 Meeting #92; R1-1802465; "Remaining issues on RACH procedure;" NTT Docomo, Inc.; Feb. 26-Mar. 2, 2018; Athens, Greece (7 pages).
3GPP TSG RAN WG1 Meeting #92; R1-1802946; "Remaining details of RACH procedure;" Ericsson; Feb. 26-Mar. 2, 2018; Athens, Greece (6 pages).
Office Action in counterpart Indian Patent Application No. 202037039215 dated Dec. 1, 2021 (6 pages).
Office Action in counterpart European Patent Application No. 18907254.9 dated Apr. 7, 2022 (6 pages).
ZTE; "Discussion on the PRACH for LAA UL"; 3GPP TSG RAN WG1 Meeting #84, R1-160335; St Julian's, Malta, Feb. 15-19, 2016 (2 pages).
Office Action in counterpart Korean Patent Application No. 10-2020-7024635 dated Apr. 20, 2022 (7 pages).
Zte et al.; "Remaining details of RACH procedure"; 3GPP TSG RAN WG1 Meeting AH 1801, R1-1800084; Vancouver, Canada; Jan. 22-26, 2018 (12 pages).

* cited by examiner

FIG.2

| PRACH MASK INDEX | ALLOWED PRACH (FDD) | ALLOWED PRACH (TDD) |
|---|---|---|
| 0 | ALL | ALL |
| 1 | PRACH RESOURCE INDEX 0 | PRACH RESOURCE INDEX 0 |
| 2 | PRACH RESOURCE INDEX 1 | PRACH RESOURCE INDEX 1 |
| 3 | PRACH RESOURCE INDEX 2 | PRACH RESOURCE INDEX 2 |
| 4 | PRACH RESOURCE INDEX 3 | PRACH RESOURCE INDEX 3 |
| 5 | PRACH RESOURCE INDEX 4 | PRACH RESOURCE INDEX 4 |
| 6 | PRACH RESOURCE INDEX 5 | PRACH RESOURCE INDEX 5 |
| 7 | PRACH RESOURCE INDEX 6 | RESERVED |
| 8 | PRACH RESOURCE INDEX 7 | RESERVED |
| 9 | PRACH RESOURCE INDEX 8 | RESERVED |
| 10 | PRACH RESOURCE INDEX 9 | RESERVED |
| 11 | EVERY, IN THE TIME DOMAIN, EVEN PRACH OPPORTUNITY 1st PRACH RESOURCE INDEX IN SUBFRAME | EVERY, IN THE TIME DOMAIN, EVEN PRACH OPPORTUNITY 1st PRACH RESOURCE INDEX IN SUBFRAME |
| 12 | EVERY, IN THE TIME DOMAIN, ODD PRACH OPPORTUNITY 1st PRACH RESOURCE INDEX IN SUBFRAME | EVERY, IN THE TIME DOMAIN, ODD PRACH OPPORTUNITY 1st PRACH RESOURCE INDEX IN SUBFRAME |
| 13 | RESERVED | 1st PRACH RESOURCE INDEX IN SUBFRAME |
| 14 | RESERVED | 2nd PRACH RESOURCE INDEX IN SUBFRAME |
| 15 | RESERVED | 3rd PRACH RESOURCE INDEX IN SUBFRAME |

USER APPARATUS AND BASE STATION APPARATUS

TECHNICAL FIELD

The present invention relates to a user apparatus and a base station apparatus in a radio communication system.

BACKGROUND ART

Concerning 3GPP (3rd Generation Partnership Project), a radio communication scheme called 5G or NR (New Radio) (hereinafter, such a radio communication scheme being referred to as "NR") has been discussed for a further increase in the system capacity, a further increase in the data transmission rate, a further reduction in the delay in the radio section, and so forth. Concerning 5G, various radio technologies have been discussed for satisfaction of requirements for the throughput greater than or equal to 10 Gbps and the delay in the radio section less than or equal to 1 ms.

According to NR, in an initial access for establishing a connection between a user apparatus and a base station apparatus, the user apparatus performs cell detection and cell identification using a synchronization signal transmitted from the base station apparatus and obtains some of system information required for the initial access (for example, Non-patent Document No. 1).

For NR, the same as for LTE (Long Term Evolution), a contention based random access procedure (CBRA) and a contention free random access procedure (CFRA) are prescribed (for example, Non-patent Document No. 2).

PRIOR ART DOCUMENTS

Non-Patent Documents

Non-patent Document No. 1:
3GPP TS 38.213 V15.0.0 (2017-12)
Non-patent Document No. 2:
3GPP TS 38.321 V15.0.0 (2017-12)

SUMMARY OF THE INVENTION

Problem to be Solved by the Invention

In NR, a synchronization signal and a part of system information necessary for an initial access are mapped in a radio frame with the use of resource units called SSBs (Synchronization Signal Blocks) made of contiguous OFDM (Orthogonal Frequency Division Multiplexing) symbols. A user apparatus receives SSBs transmitted from a base station apparatus to obtain information necessary for an initial access. Information necessary for an initial accesso includes information that identifies a PRACH (Physical Random Access Channel) resource and a preamble signal format.

In addition, according to NR, a PRACH resource to be used for a contention free random access triggered from a base station apparatus is ensured individually for each user apparatus so that a contention of a PRACH resource among user apparatuses can be avoided.

However, an indication method of a PRACH resource suitable (appropriate) for a radio frame structure of NR has not been defined for a case where individual PRACH resources are indicated to many user apparatuses.

The present invention has been devised in consideration of this point, and an object is to suitably inform of a PRACH resource to be used for a random access procedure to a user apparatus.

Means to Solve the Problem

According to the disclosed technology, a user apparatus is provided that receives an instruction to execute a random access procedure from a base station apparatus and includes a reception unit that receives first information specifying an available random access channel from the base station apparatus; a control unit that identifies, on the basis of the first information, a resource of the available random access channel in a time domain or a frequency domain; and a transmission unit that transmits a random access preamble using the identified resource.

Advantageous Effects of the Invention

Thanks to the disclosed technology, it is possible to appropriately indicate a RACH resource used for a random access procedure in NR to a user apparatus.

BRIEF DESCRIPTION OF THE DRAWINGS

FIG. 2 illustrates an example of specifying RACH resources in the time domain.

MODE FOR CARRYING OUT THE INVENTION

Below, one or more embodiments of the present invention will be described with reference to the drawings. Note that the embodiments that will now be described are merely examples and embodiments to which the present invention is applied are not limited to the embodiments that will be now described.

For a radio communication system according to the present embodiment to operate, existing technologies may be appropriately used. In this regard, the existing technologies include, for example, existing LTE. However, the existing technologies are not limited to the existing LTE. Further, unless otherwise noted, "LTE" used herein has a wide meaning covering LTE-Advanced and schemes developed after LTE-Advanced (for example, NR).

Moreover, in the following description of the embodiment, terms such as a SS (Synchronization Signal), a PSS (Primary SS), a SSS (Secondary SS), a PBCH (Physical broadcast channel), and so forth included in the existing LTE are used. However, these terms are described for the sake of convenience of explanation, and, similar signals, functions, and so forth may be referred to by different names.

In the present embodiment, the duplex scheme may be a TDD (Time Division Duplex) scheme, a FDD (Frequency Division Duplex) scheme, or another scheme (for example, Flexible Duplex, or the like). Hereinafter, transmission of a signal with the use of a transmission beam has the same meaning as transmission of a signal multiplied with a precoding vector (or precoded with a precoding vector). In the same way, reception with the use of a reception beam has the same meaning as multiplying a received signal with a predetermined weight vector. In addition, transmission of a signal with the use of a transmission beam may be expressed also as transmission of a signal with the use of a specific antenna port. In the same way, reception of a signal with the use of a reception beam may be expressed also as reception of a signal with the use of a specific antenna port. An antenna port means a logical antenna port or a physical antenna port defined in the 3GPP standard. Note that methods of forming a transmission beam and a reception beam are not limited to the above-mentioned methods. For example, also a method of changing respective angles of a plurality of antennas of a base station apparatus 100 or a user apparatus 200 may be used. Also a method of combining the method of using a precoding vector with the method of changing angles of antennas may be used. Also, different antenna panels may be used in a switching manner. Also, a method of combining a method of further using a plurality of antenna panels may be used. Also another method may be used. Moreover, for example, in a high-frequency band, a plurality of different transmission beams may be used. Using a plurality of transmission beams will be referred to as a multi-beam operation; using a single transmission beam will be referred to as a single-beam operation.

Figure 1:
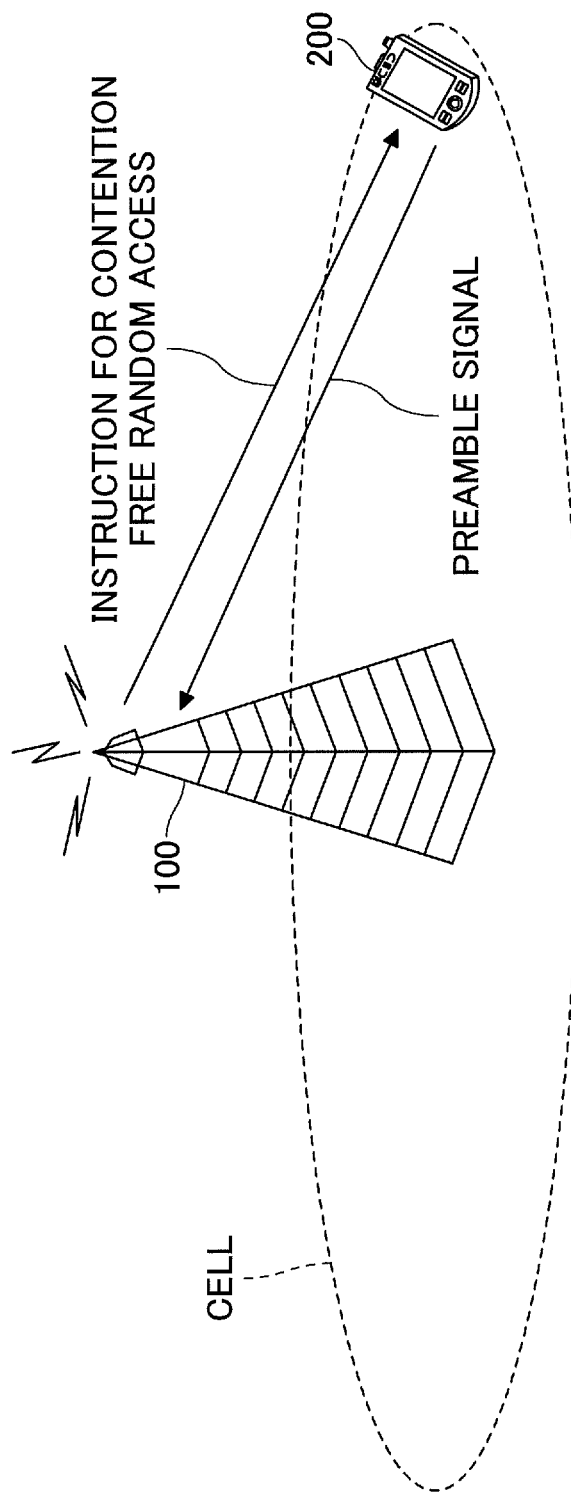
FIG. 1 illustrates an example of a radio communication system according to an embodiment of the present invention.

FIG. 1 illustrates a configuration of a communication system according to an embodiment of the present invention. The radio communication system according to an embodiment of the present invention includes, as illustrated in FIG. 1, a base station apparatus 100 and a user apparatus 200. Although the single base station apparatus 100 and the single user apparatus 200 are illustrated in FIG. 1, this is an example, and each of them may be a plurality of apparatuses.

The base station apparatus 100 provides one or more cells and is a communication apparatus that performs communication with the user apparatus 200. As illustrated in FIG. 1, the base station apparatus 100 transmits an instruction for a contention free random access to the user apparatus 200. Also, the base station apparatus 100 transmits a synchronization signal and system information to the user apparatus 200. A synchronization signal is, for example, a NR-PSS or a NR-SSS. System information is transmitted, for example, through a NR-PBCH. System information is also called broadcast information. Each of the base station apparatus 100 and the user apparatus 200 can perform signal transmission and reception using beam forming. The user apparatus 200 is a communication apparatus having a radio communication function such as a smartphone, a cellular phone, a tablet, a wearable terminal, or a communication module for M2M (Machine-to-Machine), which wirelessly connects with the base station apparatus 100, and uses various communication services provided by the radio communication system. At a stage of an initial access, as illustrated in FIG. 1, the user apparatus 200 transmits a random access preamble signal to the base station apparatus 100. A random access is implemented on the basis of, in addition to system information received through a NR-PBCH from the base station apparatus 100, RMSI (Remaining minimum system information) that is system information and received through a NR-PDSCH (Physical downlink shared channel) scheduled with a NR-PDCCH (Physical downlink control channel). RMSI includes, for example, information necessary for an initial access such as RACH setting.

FIG. 2 illustrates an example of specifying RACH resources in the time domain or the frequency domain. FIG. 2 illustrates examples of "PRACH Mask Indexes" that specify RACH resources in the time domain or the frequency domain. A "PRACH Mask Index" is information for indicating, to a user apparatus 200, a specific RACH resource available in the time domain or the frequency domain from among RACH resources specified by RACH configuration Indexes.

Concerning FDD RACHs in the example illustrated in FIG. 2, ten indexes that include a PRACH Resource Index 0 through a PRACH Resource Index 9; even-numbered PRACH transmission occasions counted from the first PRACH of a subframe; and odd-numbered PRACH transmission occasions counted from the first PRACH of a subframe can be set.

Concerning TDD RACHs in the example illustrated in FIG. 2, six indexes that include a PRACH Resource Index 0 through a PRACH Resource Index 5; even-numbered PRACH transmission occasions counted from the first PRACH of a subframe; odd-numbered PRACH transmission occasions counted from the first PRACH of a subframe; the first PRACH Resource Index of a subframe; the second PRACH Resource Index of a subframe; and the third PRACH Resource Index of a subframe can be used.

By restricting a PRACH resource used by a user apparatus 200 for PRACH transmission in the time domain or the frequency domain using a PRACH Mask index, it is possible to avoid shortage of PRACH resources for a case where individual PRACH resources are ensured for many user apparatuses 200. For example, a specific resource available to a user apparatus 200 in the time domain or the frequency domain may be prescribed by a mapping table of PRACH Mask Indexes illustrated in FIG. 3. Note that, in NR, use cases of executing random access procedures increase in comparison to LTE: a risk of depletion of PRACH resources may increase. For example, executions of random access procedures are triggered by a recovery from a beam failure; a use of on-demand system information where system information is transmitted in response to a request from a user apparatus 200; and so forth.

Figure 3:
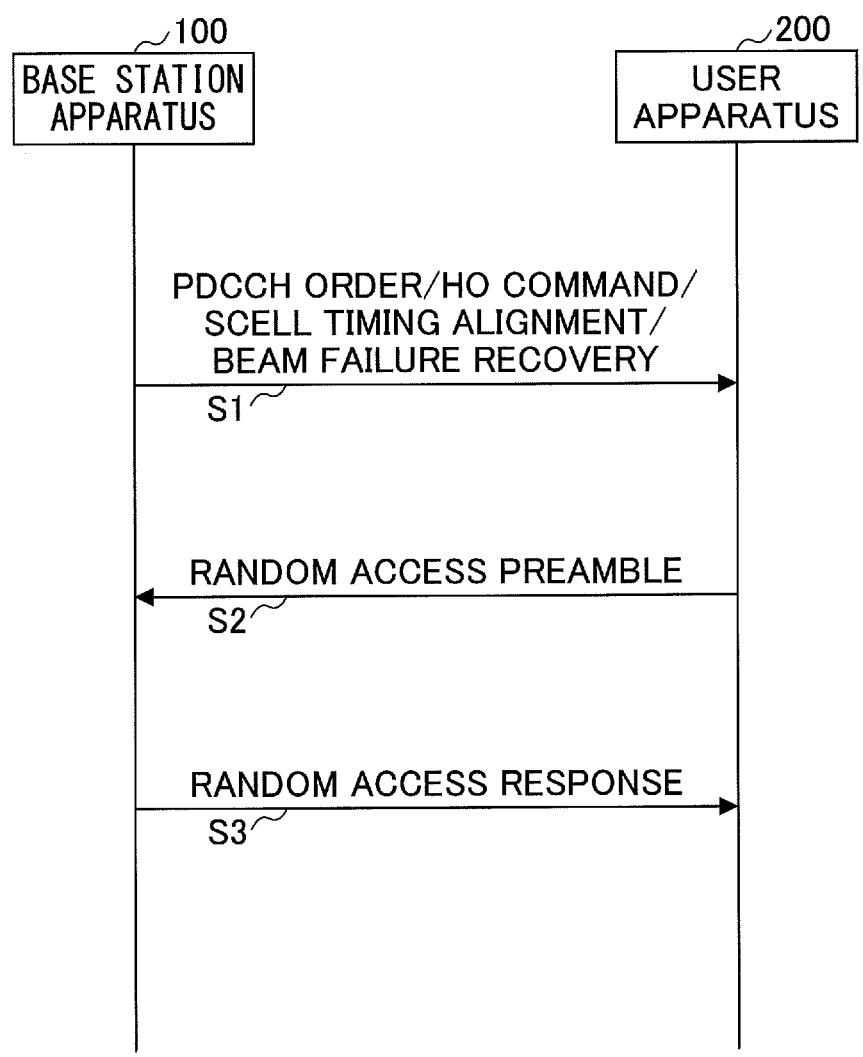
FIG. 3 is a sequence diagram illustrating an example of a random access procedure according to an embodiment of the present invention.

FIG. 3 is a sequence diagram illustrating an example of a random access procedure according to an embodiment of the present invention. In step S1, an instruction to execute a contention free random access procedure triggered by a PDCCH order, a HO command (handover command), a SCell timing alignment (a secondary cell timing alignment), a beam failure recovery (a recovery from a beam failure), or the like is sent from a base station apparatus 100 to a user apparatus 200. A PDCCH order is such that, for example, for a case where there is a possibility that an UL (uplink) synchronization failure occurs in a user apparatus 200 in a connected mode, the user apparatus 200 is triggered from a network to execute a random access procedure for a synchronization recovery. A handover command is such that, at a time of handover, a user apparatus 200 is triggered to execute a random access procedure for a target cell. A secondary cell timing alignment is such that, for a secondary cell timing alignment, a user apparatus 200 is triggered to execute a random access procedure for a secondary cell. For a recovery from a beam failure, a user apparatus 200 is triggered to execute a random access procedure.

In addition, in LTE for example, through an instruction to execute a contention free random access, information such as a preamble index (6 bits) and a PRACH Mask Index (4 bits) illustrated in FIG. 2 that identify a RACH resource and a preamble index are sent to a user apparatus 200 with the use of a DCI (Downlink Control Information) format 1A. In some cases, above-mentioned information that identifies a RACH resource and a preamble index is sent through a RRC (Radio Resource Control) signaling.

As a result of a user apparatus 200 executing a random access procedure using a preamble index and a PRACH resource thus specified, the user apparatus 200 can execute a contention free random access. Note that, in a case of a contention based random access, a preamble to be used is selected in a random manner from among a predetermined extent of preamble indexes.

In step S2, on the basis of information that identifies a RACH resource and a preamble index obtained in step S1, the user apparatus 200 transmits a random access preamble to the base station apparatus 100.

In step S3, the base station apparatus 100 transmits a random access response to the user apparatus 200. A random access response is a response to a random access preamble, is transmitted for a RA-RNTI (Random Access—Radio Network Temporary Identifier) through a PDCCH, and includes at least an identifier of the random access preamble, a timing alignment, and an initial uplink grant. In a case of a contention free random access, the random access procedure is completed in step S3.

Figure 4:
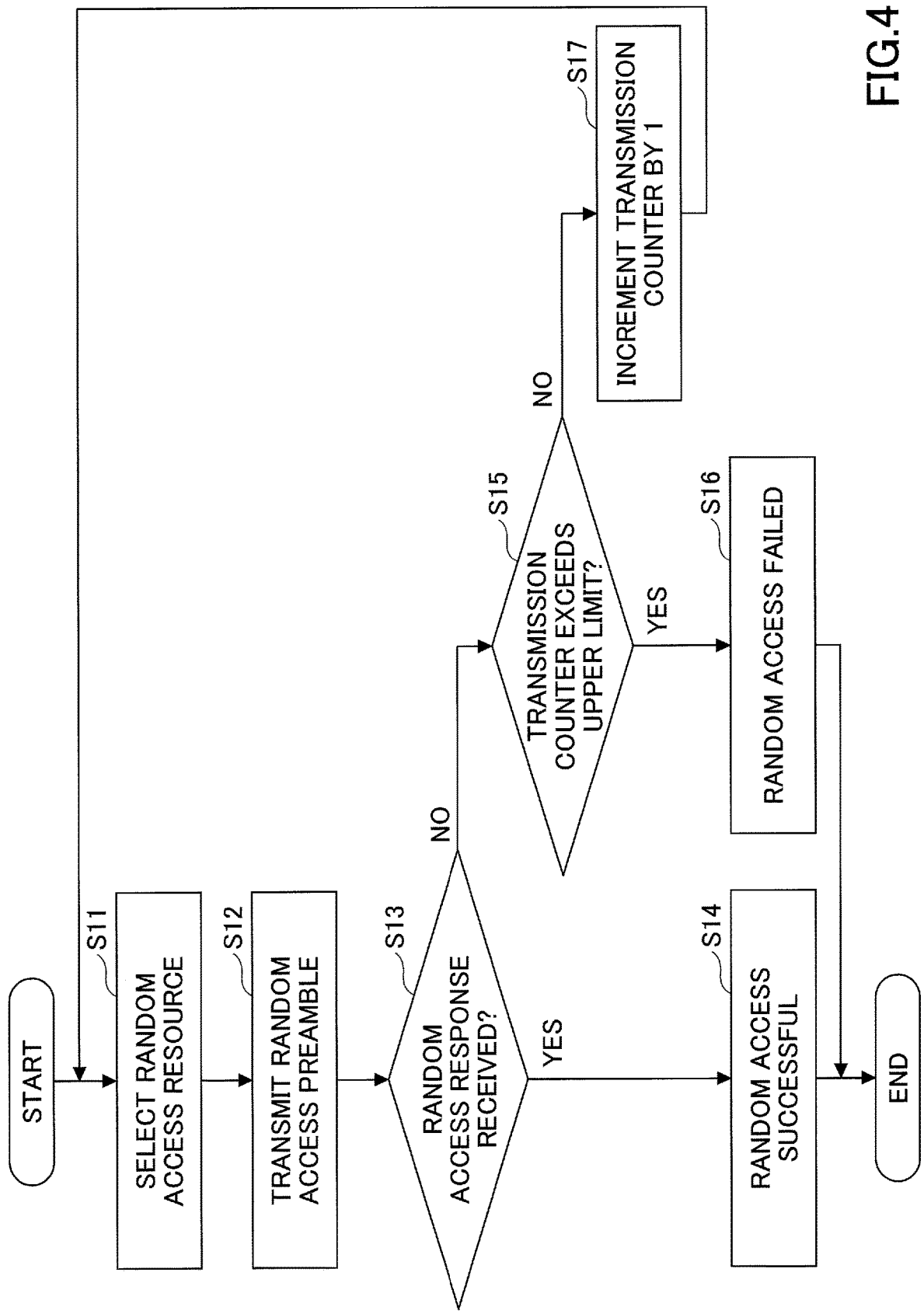
FIG. 4 is a flowchart illustrating an example of a random access procedure according to an embodiment of the present invention.
Figure 5:
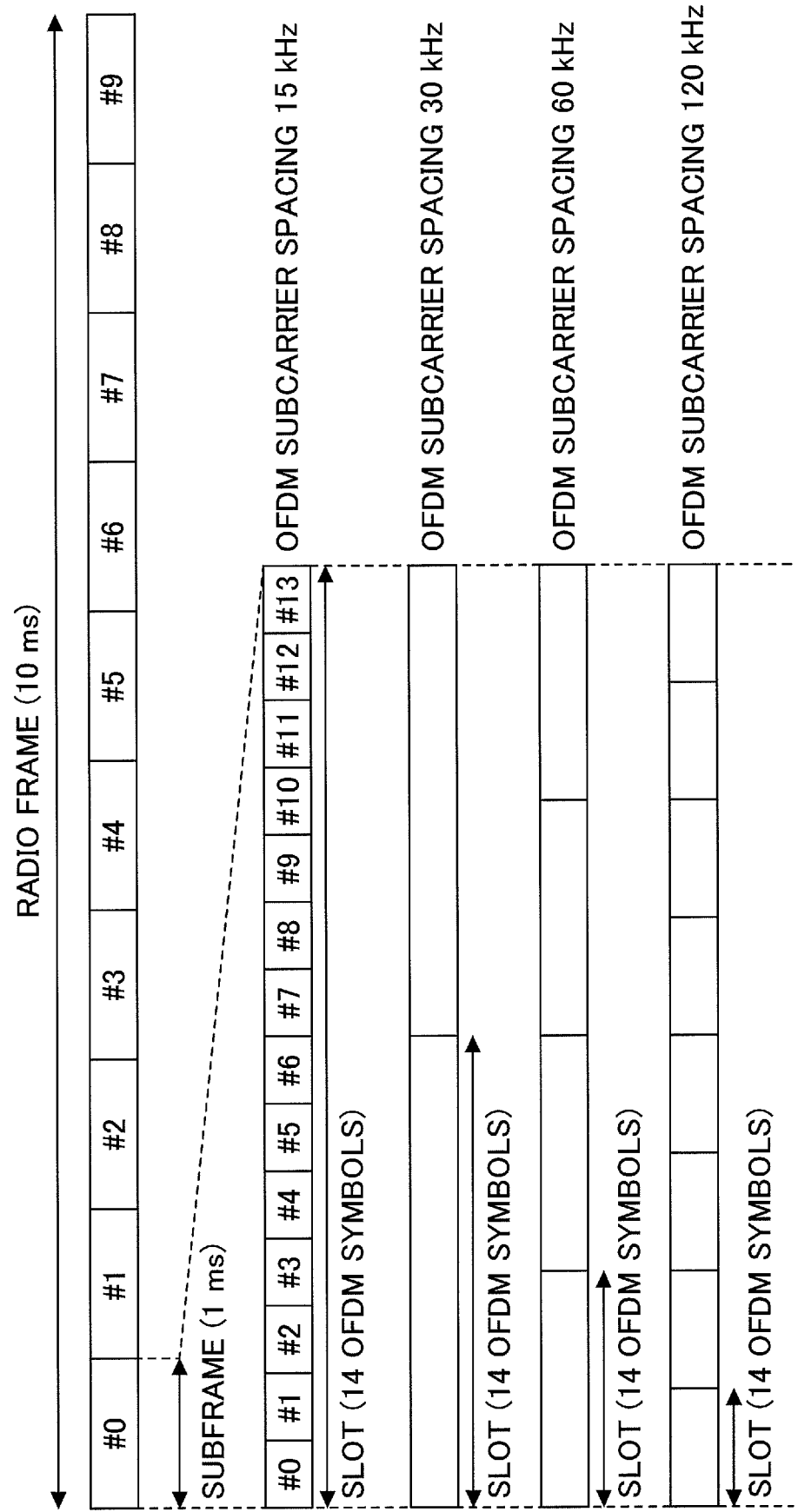
FIG. 5 illustrates an example of a radio frame in the time domain according to an embodiment of the present invention.

FIG. 4 is a flowchart illustrating an example of a random access procedure according to an embodiment of the present invention. FIG. 5 illustrates one example of a contention free random access procedure in a user apparatus 200. A base station apparatus 100 transmits a PSS, a SSS, and a PBCH to the user apparatus 200. A PBCH includes a part of system information. Note that, at a time to start a random access procedure, a transmission counter is set to "1".

In step S11, the user apparatus 200 selects a resource to be used for a random access on the basis of information that identifies a resource received from the base station apparatus 100 for executing a random access procedure, i.e., information that identifies a RACH resource identified in the frequency domain and the time domain, a preamble format, and so forth. Next, the user apparatus 200 uses the selected resource to transmit a random access preamble (S12). A transmission power setup for the random access preamble will be described later.

In step S13, the user apparatus 200 receives a random access response from the base station apparatus 100. A random access response is a response to a random access preamble. For a case where a random access response is received at the user apparatus 200 (YES in S13), the process proceeds to step S14. For a case where a random access response is not received at the user apparatus 200 (NO in S13), the process proceeds to step S15.

In step S14, the user apparatus 200 determines that the random access is successful, and ends the random access procedure.

In step S15, the user apparatus 200 determines whether the transmission counter has exceeded an upper limit that is indicated or prescribed. For a case where the upper limit has been exceeded (YES in S15), the process proceeds to step S17. For a case where the upper limit has not been exceeded (NO in S15), the process proceeds to step S17.

In step S16, the user apparatus 200 determines that the random access is failed and ends the random access procedure. In step S17, the user apparatus 200 increments the transmission counter by 1, returns to step S11 to retransmit a random access preamble, and again selects a random access resource.

In a PRACH Mask Index according to the specification of MAC (Medium Access Control) in LTE, a resource position of a PRACH that a user apparatus 200 can use in the time domain can be specified in subframe units in a radio frame; in a case of TDD, a resource position in the frequency domain that a user apparatus 200 can use can be specified in PRACH units. On the other hand, according to NR, placing or specifying of a PRACH resource in the time domain or the frequency domain is performed flexibly. Therefore, it is necessary to design a PRACH Mask Index in such a manner that a PRACH Mask Index will conform to placing or specifying of a PRACH resource in NR.

In the time domain for a NR-PRACH, a PRACH resource can be set in OFDM symbol units. In the frequency domain for a NR-PRACH, a Common PRACH used in common among user apparatuses 200 and a Dedicated PRACH allocated individually for each user apparatus 200 can be specified. For a CFRA in LTE, a resource to be used is specified from among PRACHs shared among user apparatuses 200. For a CFRA in NR, it is possible to specify a resource used individually by each user apparatus 200. In addition, according to NR, a BWP (Bandwidth part) and a SUL (Supplemental UL) have been introduced and it is possible to flexibly use a resource in the frequency domain.

FIG. 5 illustrates an example of a radio frame in the time domain according to an embodiment of the present invention. As illustrated in FIG. 5, in a radio frame of 10 ms in NR, 10 subframes of 1 ms are arranged. A slot is formed of 14 OFDM symbols. In a case where an OFDM subcarrier spacing is 15 kHz, 1 slot can be placed at 1 subframe. In a case where an OFDM subcarrier spacing is 30 kHz, 2 slots can be placed at 1 subframe. In a case where an OFDM subcarrier spacing is 60 kHz, 4 slots can be placed at 1 subframe. In a case where an OFDM subcarrier spacing is 120 kHz, 8 slots can be placed at 1 subframe.

For a PRACH resource that can be used by a user apparatus 200, a subframe number, a slot number, or an OFDM symbol number may be explicitly specified by a PRACH Mask Index. In a case where an OFDM subcarrier spacing is 120 kHz, 80 slots, i.e., 1120 OFDM symbols are arranged in a radio frame of 10 ms. Therefore, signaling of 11 bits may be performed for explicitly specifying an OFDM symbol number. Instead of an OFDM symbol number, a subframe number or a slot number may be used to specify an available PRACH resource.

In addition, instead of a subframe number, a slot number, or an OFDM symbol number, a number specifying a predetermined PRACH transmission occasion (PRACH occasion) may be used to specify a PRACH resource that a user apparatus 200 can use by a PRACH Mask Index. A PRACH transmission occasion is identified in accordance with a predetermined pattern, and therefore, it is possible to reduce signaling information in comparison to a case of explicitly specifying an OFDM symbol number.

In addition, a granularity with which a PRACH resource available to a user apparatus 200 can be specified by a PRACH Mask Index may differ depending on the UE capability of a user apparatus 200 or the frequency or the subcarrier spacing at which the communication is performed. The frequency at which the communication is performed may be a band or a band combination. For example, a user apparatus 200 may indicate, to a network, the UE capability, and the network may determine, on the basis of the indicated UE capability, a granularity with which a PRACH Mask Index specifies a PRACH resource. Alternatively, the network may determine a granularity with which a PRACH Mask Index specifies a PRACH resource on the basis of the network capability in addition to the UE capability. For example, even for a case where a user apparatus 200 is adapted to a PRACH resource being specified with the use of an OFDM symbol number, a network indicates to the user apparatus 200 or sets the user apparatus 200 that a PRACH resource with the use of a slot number will be specified for a case where the network is adapted to specifying a PRACH resource only with the use of granularity up to a slot number. In a case where it has been thus set or indicated to specify a PRACH resource with the use of a slot number, the user apparatus 200 may ignore an instruction of specifying a PRACH resource with the use of an OFDM symbol number.

In addition, a PRACH resource in the time domain that a user apparatus 200 can use may be specified by a PRACH Mask Index for a plurality of subframes, slots, or OFDM symbols. For example, subframe numbers "0, 2, 4, 6, and 8" may be indicated. That is, a PRACH resource is specified at a cycle of 2 ms. In addition, for example, a subframe, a slot or an OFDM symbol that is used as a starting point together with a cycle at which a PRACH resource is placed may be explicitly specified. For example, a subframe number "3" may be specified and a cycle "3 ms" may be indicated. Because the subframe number "3" is used as a starting point and the cycle is "3 ms", PRACH resources are placed at subframes having the numbers 3, 6, and 9.

In addition, a PRACH resource in the time domain that a user apparatus 200 can use may be specified partially implicitly by a PRACH Mask Index. Any of a subframe number, a slot number, and a OFDM symbol number may be implicitly determined. In a case where a PRACH resource is thus specified partially implicitly, the user apparatus 200 estimates a prescribed specific subframe number, slot number or OFDM symbol number.

For example, the first subframe, slot, or OFDM symbol in the time domain may be implicitly specified. Alternatively, a subframe, a slot, or an OFDM symbol having a specific number or an identifier may be implicitly specified. In addition, for example, a Y-th subframe, slot, or OFDM symbol may be implicitly specified for a case of assuming a specific cycle X. A cycle X may be specified by radio frames, subframes, slots, or OFDM symbols. A Y-th subframe, slot, or OFDM symbol may be specified as odd-numbered subframes, slots, or OFDM symbols or even-numbered subframes, slots, or OFDM symbols. A subframe, slot, or OFDM symbol as a starting point of a cycle X may be explicitly specified or implicitly determined by a user apparatus 200. Examples of an implicitly determined timing include a timing at which a random access procedure is triggered, i.e., a timing at which a PDCCH order or the like is received; a timing of a PRACH resource placed immediately after a timing at which a random access procedure is triggered; a timing later by a predetermined time than a timing at which a random access procedure is triggered; or a timing of a PRACH resource placed immediately after a predetermined time from a timing at which a random access procedure is triggered may be used.

In addition, a PRACH resource in the time domain that a user apparatus 200 can use may be limited by a PRACH Mask Index to a slot or an OFDM symbol placed at a PRACH channel corresponding to a SSB that is used by a user apparatus 200 in a case where the user apparatus 200 uses analog beam forming for transmission and reception. A SSB that is used by a user apparatus 200 may be a SSB that is currently used by the user apparatus 200 or a SSB defined for the cell. Alternatively, a SSB that is used by a user apparatus 200 may be, in a case where a SSB is specified together with a PRACH resource, the specified SSB.

In this regard, in a case where a PRACH resource other than a PRACH resource corresponding to a SSB that is used by a user apparatus 200 is specified, the fact of specifying of a PRACH resource other than a PRACH resource corresponding to a SSB that is used by a user apparatus 200 is indicated to a network through any layer of RRC, MAC, and a layer 1. At this indicating, a dedicated "cause" may be set.

The number of a subframe, a slot, or an OFDM symbol to be estimated in a case where a PRACH resource available to a user apparatus 200 in the time domain is implicitly specified by a PRACH Mask Index may differ for each user apparatus 200 or each group of user apparatuses 200. Which of the number of a subframe, the number of a slot, and the number of an OFDM symbol is used for being estimated, in a case where a PRACH resource in the time domain available to a user apparatus 200 is implicitly specified by a PRACH Mask Index, may be indicated through any layer of RRC, MAC, and a layer 1, or may be prescribed.

A specific method of specifying by a PRACH Mask Index a PRACH resource in the time domain that a user apparatus 200 can use described above may differ for each case where a contention free random access is triggered such as a PDCCH order, a handover command, a secondary cell timing alignment, or a recovery from a beam failure. For example, in a case, such as a case of a handover command or a recovery from a beam failure, where it is possible to send a certain number of bits through RRC signaling on a per-user apparatus 200 basis, a PRACH Mask Index may be used to explicitly specify a PRACH resource in the time domain that the user apparatus 200 can use; in a case, such as a case of a PDCCH order, where the number of bits to be sent is relatively small and it is possible to send a certain number of bits through RRC signaling on a per-user apparatus 200 basis, a PRACH Mask Index may be used to implicitly specify a PRACH resource in the time domain that the user apparatus 200 can use.

In addition, a specific method of specifying by a PRACH Mask Index a PRACH resource in the time domain that a user apparatus 200 can use described above may be ignored for a specific case. For example, for a case where a PRACH resource in a specific frequency is specified, a PRACH resource need not be specified according to a method described above.

Figure 6A:
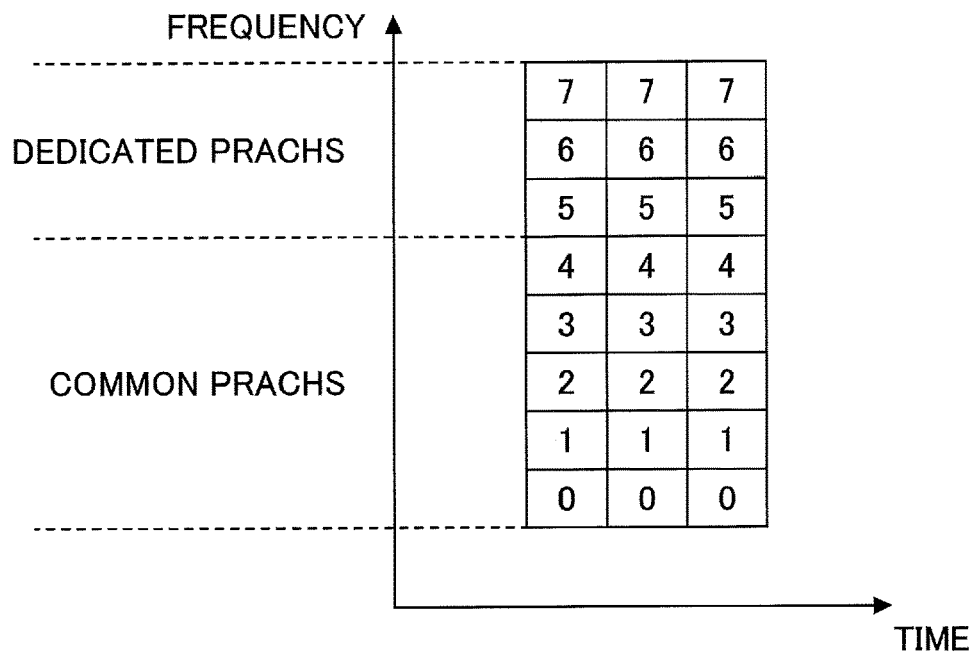
FIG. 6A illustrates a first example of indexes in the frequency domain according to an embodiment of the present invention.

FIG. 6A illustrates a first example of indexes in the frequency domain according to an embodiment of the present invention. As illustrated in FIG. 6A, as a method of specifying a PRACH resource in the frequency domain that a user apparatus 200 can use by a PRACH Mask Index, an index corresponding to a Common PRACH or a Dedicated PRACH may be indicated. A Common PRACH indicates a frequency domain where PRACH resources used by user apparatuses 200 in common are arranged. A Dedicated PRACH indicates a frequency domain where PRACH resources used by user apparatuses 200 individually are arranged. However, there may be a case where a Dedicated PRACH is shared by a plurality of user apparatuses 200.

In FIG. 6A, Common PRACHs and Dedicated PRACHs are provided with a sequence of indexes 0-7. Indexes 0-4 correspond to Common PRACHs and indexes 5-7 correspond to Dedicated PRACHs. With the use of an index, a PRACH resource in the frequency domain that a user apparatus 200 can use is specified by a PRACH Mask Index.

Figure 6B:
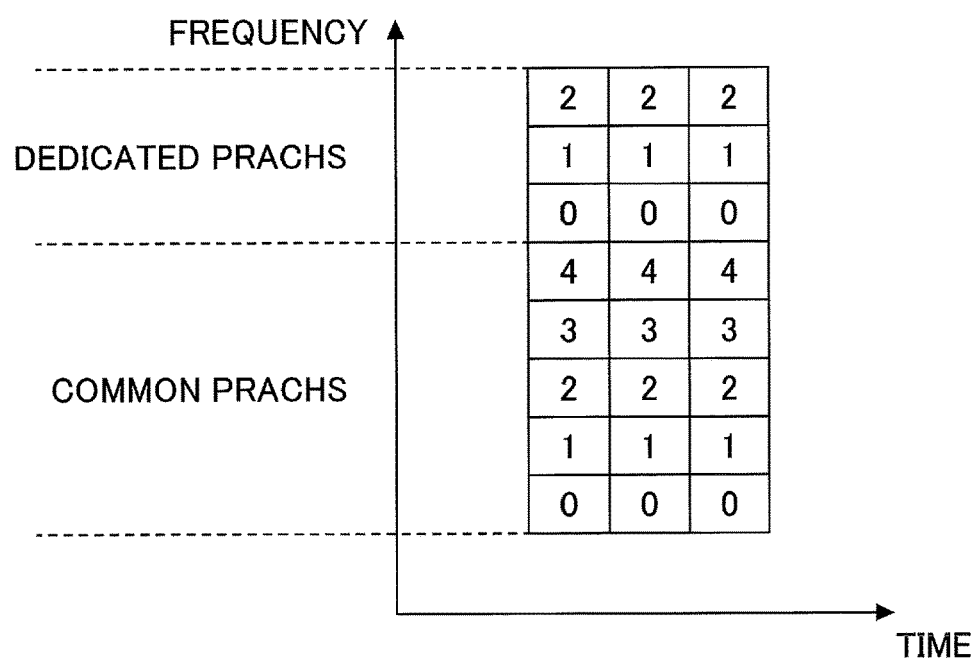
FIG. 6B illustrates a second example of indexes in the frequency domain according to an embodiment of the present invention.

FIG. 6B illustrates a second example of indexes in the frequency domain according to an embodiment of the present invention. FIG. 6B illustrates an example where indexes 0-4 are allocated to Common PRACHs; indexes 0-2 are allocated to Dedicated PRACHs. In other words, Common PRACHs or Dedicated PRACHs are provided with an individual index sequence. With the use of an index, a PRACH resource in the frequency domain that a user apparatus 200 can use is specified by a PRACH Mask Index.

In a case where an index illustrated in FIG. 6B is indicated, information indicating whether a Common PRACH or a Dedicated PRACH is specified is sent together with an index itself. In this regard, assuming that there is no case where a Common PRACH is specified in a case where a Dedicated PRACH is set, a user apparatus 200 may ignore a part or all of information in a PRACH Mask Index specifying a segment in the frequency domain in a case where a Dedicated PRACH is specified.

Figure 7A:
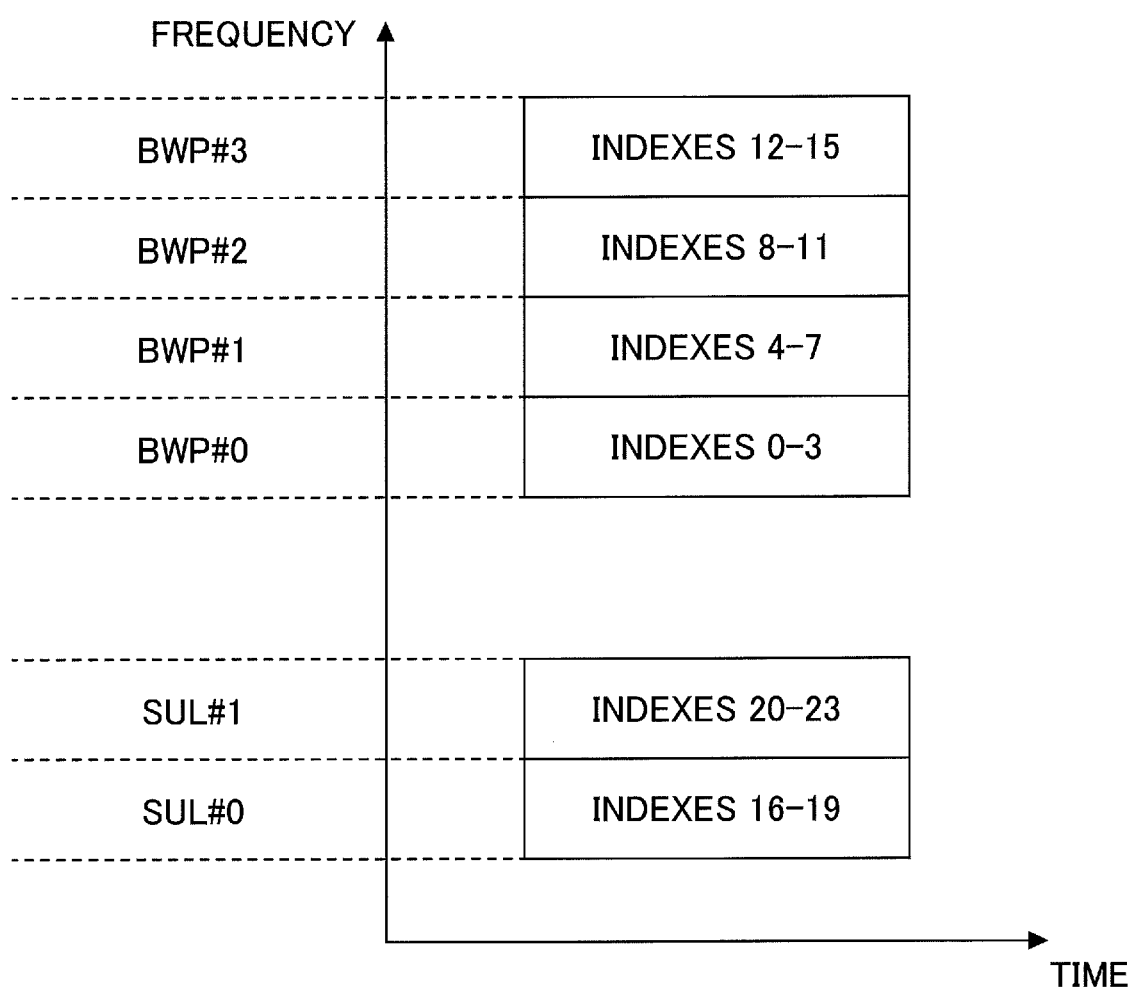
FIG. 7A illustrates a third example of indexes in the frequency domain according to an embodiment of the present invention.

FIG. 7A illustrates a third example of indexes in the frequency domain according to an embodiment of the present invention. As illustrated in FIG. 7A, as a method of specifying a PRACH resource in the frequency domain that a user apparatus 200 can use by a PRACH Mask Index, an index with which a BWP number or a SUL number is provided may be indicated.

FIG. 7A illustrates an example where BWPs and SULs are provided with a sequence of indexes 0-23. A BWP #0 is provided with indexes 0-3; a BWP #1 is provided with indexes 4-7; a BWP #2 is provided with indexes 8-11; a BWP #3 is provided with indexes 12-15; a SUL #0 is provided with indexes 16-19; and a SUL #1 is provided with indexes 20-23. With the use of an index, a PRACH resource in the frequency domain that a user apparatus 200 can use is specified on a corresponding BWP or SUL by a PRACH Mask Index. That is, a user apparatus 200 can identify a BWP or a SUL at which a PRACH resource is placed. Note that the specific manner in which BWPs and SULs are provided with indexes in FIG. 7A is an example. For example, it is also possible to first provide SULs with index numbers. In addition, the number of indexes allocated to one BWP or SUL is not limited to 4. In addition, a sequence of indexes may be provided regardless of BWPs, non-SUL or SULs.

Figure 7B:
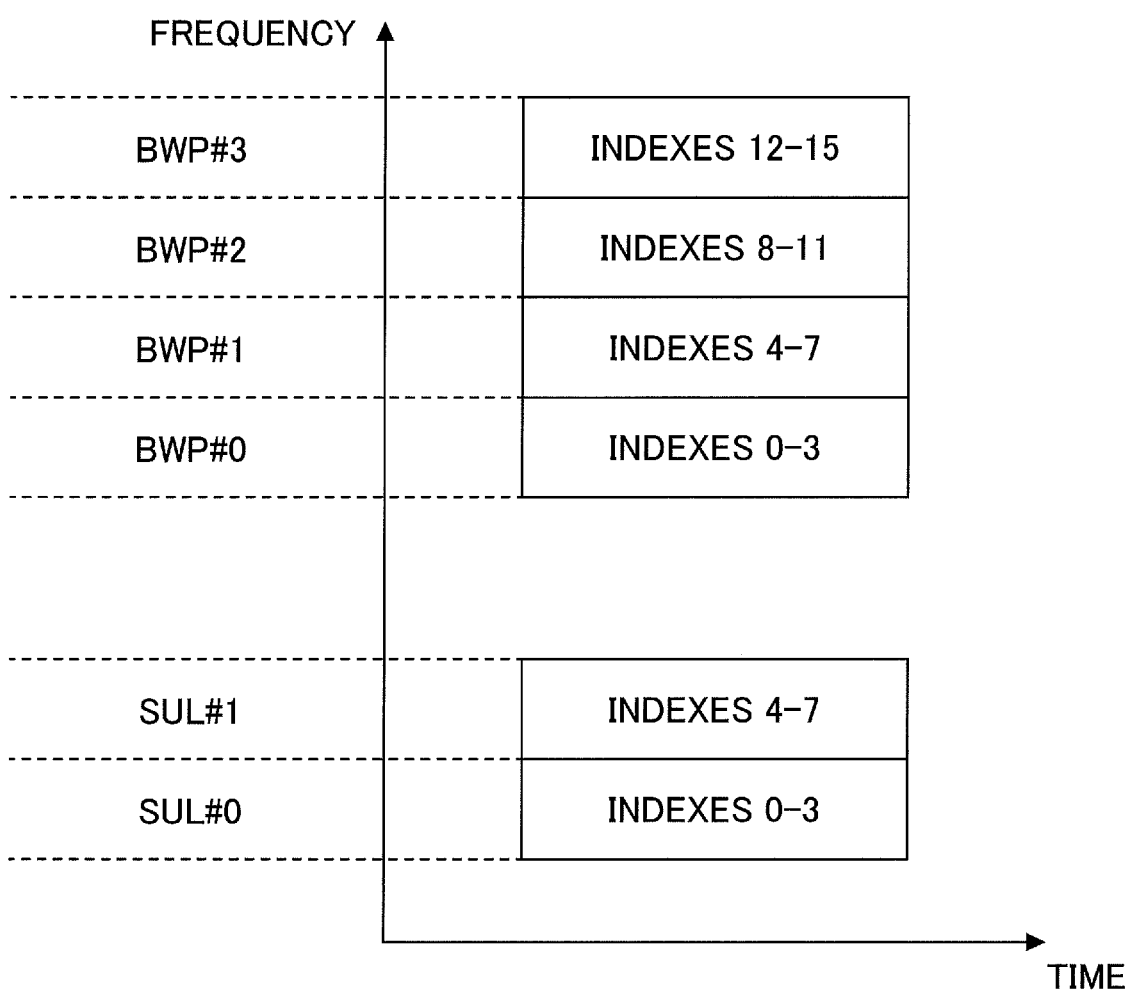
FIG. 7B illustrates a fourth example of indexes in the frequency domain according to an embodiment of the present invention.

FIG. 7B illustrates a fourth example of indexes in the frequency domain according to an embodiment of the present invention. FIG. 7B illustrates an example where BWPs are provided with an index sequence 0-15; SULs are provided with a sequence of indexes 0-7. A BWP #0 is provided with Indexes 0-3; a BWP #1 is provided with indexes 4-7; a BWP #2 is provided with indexes 8-11; a BWP #3 is provided with indexes 12-15; a SUL #0 is provided with indexes 0-3; and a SUL #1 is provided with indexes 4-7. With the use of an index, a PRACH resource in the frequency domain that a user apparatus 200 can use is specified on a corresponding BWP or SUL by a PRACH Mask Index. In addition, information indicating whether a BWP or a SUL is specified may be indicated together with an index itself. Note that the specific manner in which BWPs and SULs are provided with indexes in FIG. 7B is an example. For example, the length of a sequence of indexes may differ for each BWP or each SUL. In addition, each BWP, each non-SUL, or each SUL may be provided with a sequence of indexes.

Figure 7C:
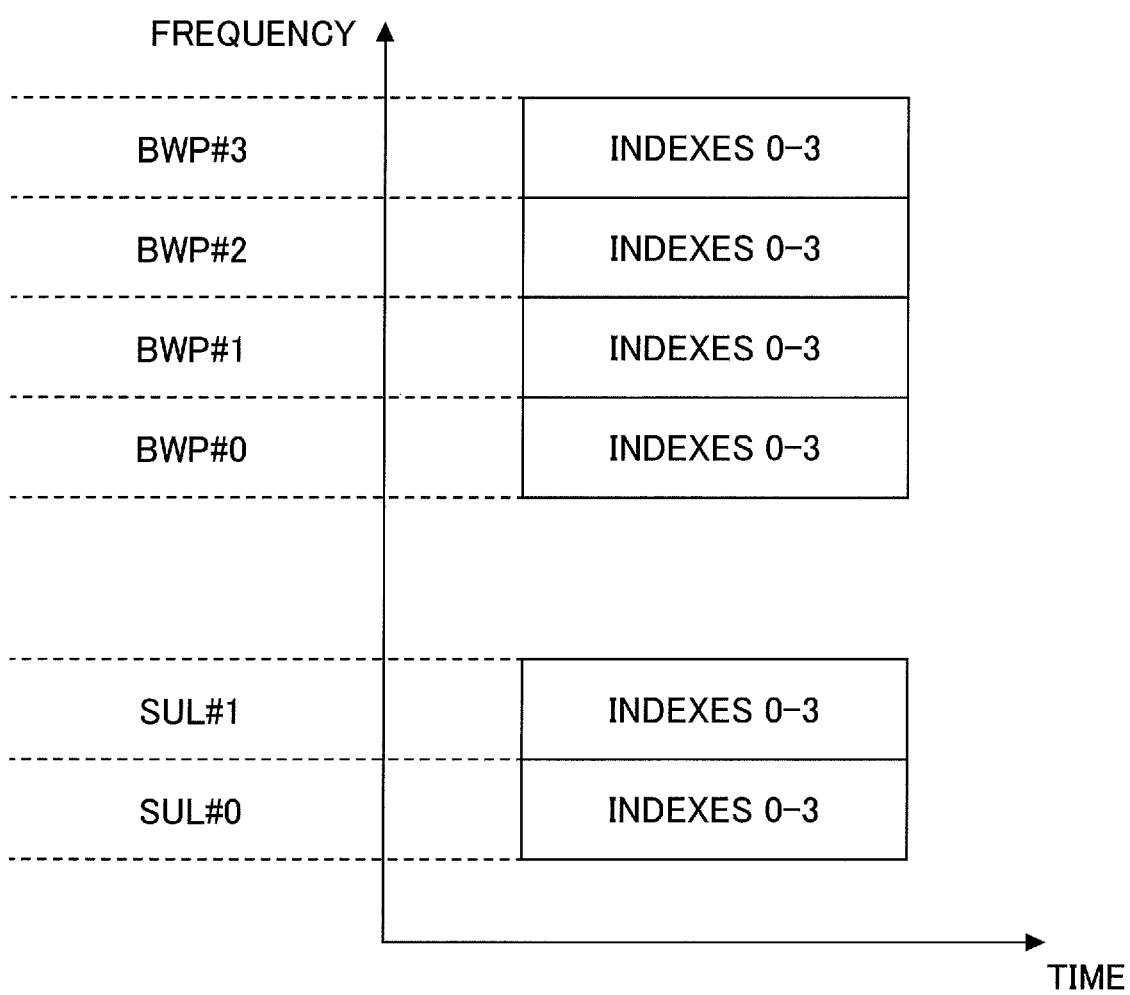
FIG. 7C illustrates a fifth example of indexes in the frequency domain according to an embodiment of the present invention.

FIG. 7C illustrates a fifth example of indexes in the frequency domain according to an embodiment of the present invention. FIG. 7C illustrates an example where each BWP is provided with a sequence of indexes 1-3; each SUL is provided with a sequence of indexes 1-3. BWP #0, BWP #1, BWP #2, BWP #3, SUL #0, and SUL #1 are, in common, provided with Indexes 1-3. With the use of an index, a PRACH resource in the frequency domain that a user apparatus 200 can use is specified on a corresponding BWP or SUL by a PRACH Mask Index. Note that the specific manner in which BWPs and SULs are provided with indexes in FIG. 7C is an example. For example, the length of a sequence of indexes may differ for each BWP or each SUL. In addition, each BWP, each non-SUL, or each SUL may be provided with a sequence of indexes.

Which method from among the above-described methods of specifying a PRACH resource in the time domain or the frequency domain that a user apparatus 200 can use by a PRACH Mask Index to be used may differ for each case where a contention free random access is triggered such as a PDCCH order, a handover command, a secondary cell timing alignment, or a recovery from a beam failure.

A method of specifying a PRACH resource in the time domain or the frequency domain that a user apparatus 200 can use by a PRACH Mask Index described above may be applied to a case where a PRACH resource can be individually allocated to a user apparatus 200 or a group of user apparatuses 200, regardless of a state(s) (mode(s)) of the user apparatus(es) 200, i.e., a RRC idle state, a RRC connected state, or a RRC suspended state. For example, an individual PRACH resource may be allocated to a user apparatus 200 that is in an idle state through broadcast information on the basis of an identifier (IMEI, a telephone number, or the like) of the user apparatus 200.

Concerning specifying of a PRACH resource in the time domain or the frequency domain that a user apparatus 200 can use by a PRACH Mask Index, in a case where there is only one PRACH resource that can be specified by a base station apparatus 100 to a user apparatus 200, an information element specifying a PRACH resource included in information that is to be sent to the user apparatus 200 may be omitted; may be ignored by the user apparatus 200; or the user apparatus 200 may perform a specific interpretation on the information element. A case where there is only one PRACH resource is, for example, a case where a Dedicated PRACH resource is allocated to a user apparatus 200 and a PRACH resource is uniquely determined as the Dedicated PRACH resource. A specific interpretation is to interpret an information element as "any", "all", "out-of-range", "invalid", or the like.

According to the above-described embodiment, a user apparatus 200 can identify, on the basis of a PRACH Mask Index indicated from a base station apparatus 100, a PRACH resource in the time domain or the frequency domain that can be used by the user apparatus 200 to execute a contention free random access procedure.

Thus, it is possible to suitably indicate a RACH resource used for a random access procedure in NR to a user apparatus.

Apparatus Configuration

Next, a functional configuration example of a base station apparatus 100 and a user apparatus 200 implementing the above-described processes and operations will be described. Each of the base station apparatus 100 and the user apparatus 200 has at least the functions implementing the above-described embodiment. However, each of the base station apparatus 100 and the user apparatus 200 may have only some of the functions of the embodiment.

Base Station Apparatus 100

Figure 8:
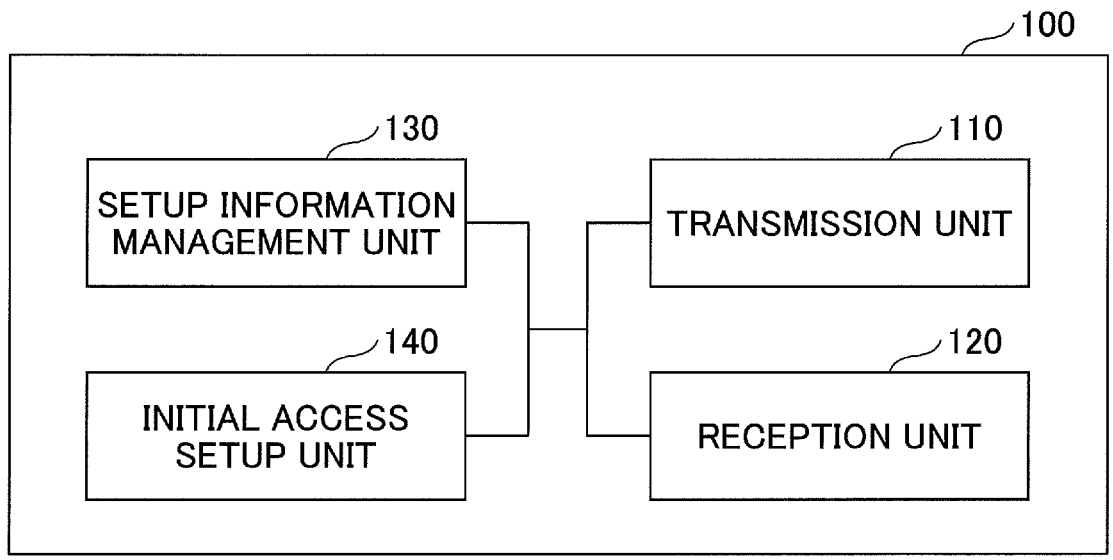
FIG. 8 illustrates an example of a functional configuration of a base station apparatus 100.

FIG. 8 illustrates one example of a functional configuration of a base station apparatus 100. As illustrated in FIG. 8, a base station apparatus 100 includes a transmission unit 110, a reception unit 120, a setup information management unit 130, and an initial access setup unit 140. The functional configuration illustrated in FIG. 8 is merely one example. As long as the operations concerning the present embodiment can be implemented, function classifications and names of functional units can be any classifications and names.

The transmission unit 110 includes functions to generate a signal to be transmitted to the user apparatus 200 and transmit the signal wirelessly. The reception unit 120 includes functions to receive various signals transmitted from a user apparatus 200 and obtain, for example, information of an upper layer from a received signal of a physical layer. In addition, the transmission unit 110 has functions to transmit, to a user apparatus 200, a NR-PSS, a NR-SSS, a NR-PBCH, DL/UL control signals, and so forth. In addition, for example, the transmission unit 110 has a function to transmit to a user apparatus 200 broadcast information including information to be used for an initial access or UL scheduling; and the reception unit 120 has a function to receive from a user apparatus 200 a RACH preamble.

The setup information management unit 130 stores previously set setup information and various sorts of setup information to be transmitted to a user apparatus 200. The contents of setup information are, for example, information concerning transmission/reception parameters for an initial access.

As described above concerning the embodiment, the initial access setup unit 140 sends information to be used for an initial access to a user apparatus 200, performs a process at a time of receiving a random access preamble transmitted from a user apparatus 200, transmits a random access response, and so forth.

User Apparatus 200

Figure 9:
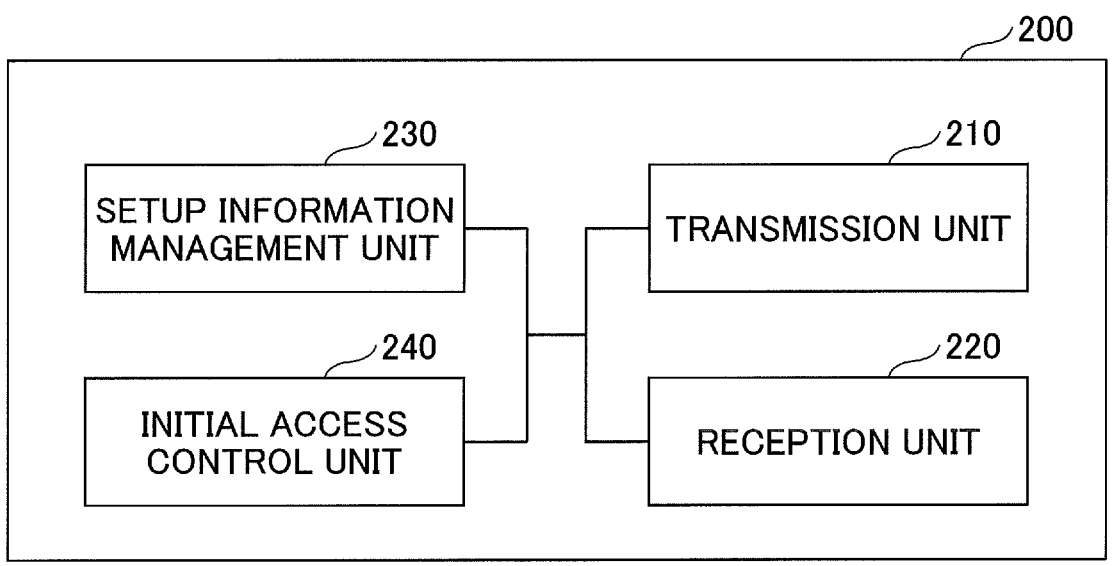
FIG. 9 illustrates an example of a functional configuration of a user apparatus 200.

FIG. 9 illustrates one example of a functional configuration of a user apparatus 200. As illustrated in FIG. 9, a user apparatus 200 includes a transmission unit 210, a reception unit 220, a setup information management unit 230, and an initial access control unit 240. The functional configuration illustrated in FIG. 9 is merely one example. As long as the operations concerning the present embodiment can be implemented, function classifications and names of functional units can be any classifications and names.

The transmission unit 210 generates a transmission signal from transmission data and transmits the transmission signal wirelessly. The reception unit 220 receives various signals wirelessly and obtains information of an upper layer from a received signal of a physical layer. In addition, the reception unit 220 has functions to receive a NR-PSS, a NR-SSS, a NR-PBCH, DL/UL control signals, and so forth transmitted from a base station apparatus 100. In addition, the transmission unit 210 has a function to transmit to a base station apparatus 100 a NR-PRACH, a NR-PUSCH, and so forth.

The setup information management unit 230 stores various sorts of setup information received from a base station apparatus 100 or a user apparatus 200 through the reception unit 220. The setup information management unit 230 also stores previously set setup information. The contents of setup information are, for example, information concerning transmission/reception parameters.

As described above concerning the embodiment, the initial access control unit 240 generates a preamble and a message concerning an initial access to be transmitted from the user apparatus 200 to a base station apparatus 100. In addition, the initial access control unit 240 controls transmission power of a preamble for an initial access. Note that functional units concerning signal transmission in the initial access control unit 240 may be included in the transmission unit 210, and functional units concerning signal reception in the initial access control unit 240 may be included in the reception unit 220.

Hardware Configuration

The block diagrams (FIGS. 8 and 9) used in the description for the above-mentioned embodiment illustrate blocks in function units. These functional blocks (configuration units) are implemented by an arbitrary combination of hardware and/or software. In this regard, means for implementing various functional blocks are not limited. That is, each functional block may be implemented by one device that is a physical and/or logical combination of a plurality of elements. In addition, each functional block may be implemented by two or more devices that are physically and/or logically separated and directly and/or indirectly (for example, in a wired and/or wireless manner) connected together.

Figure 10:
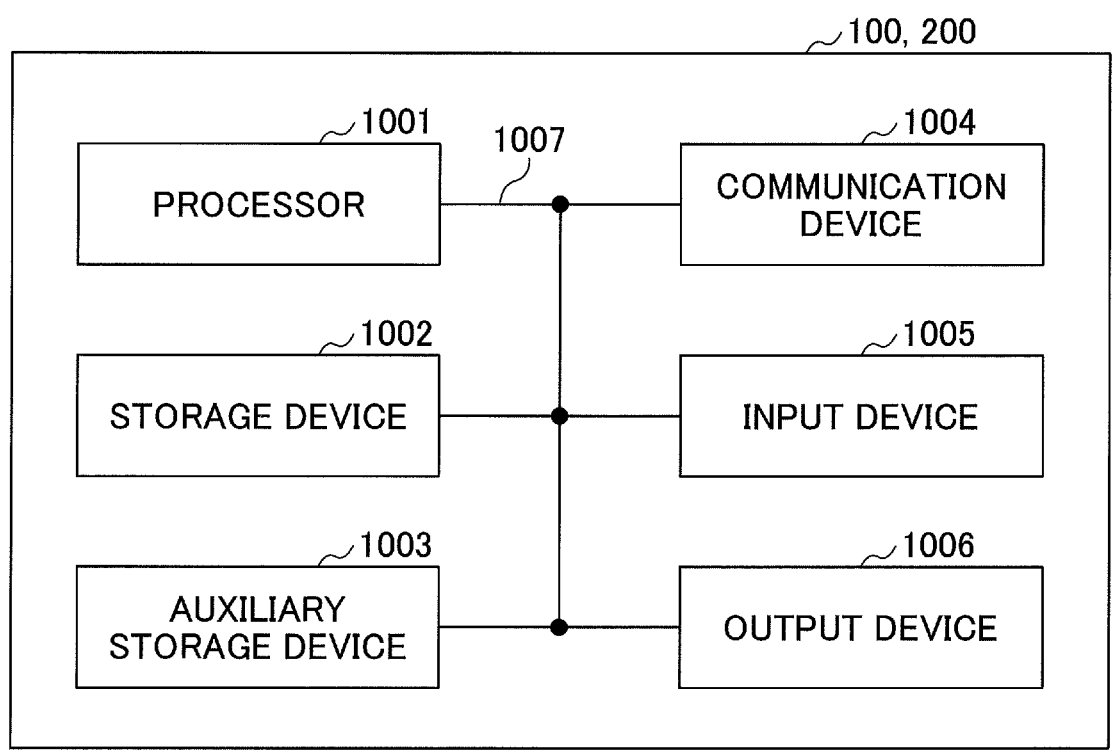
FIG. 10 illustrates an example of a hardware configuration of the base station apparatus 100 or the user apparatus 200.

Further, for example, each of a base station apparatus 100 and a user apparatus 200 according to an embodiment of the present invention may function as a computer that performs processes according to the present embodiment. FIG. 10 illustrates one example of a hardware configuration of a radio communication apparatus that is a base station apparatus 100 or a user apparatus 200 according to the present embodiment. Each of the above-described base station apparatus 100 and user apparatus 200 may be configured as a computer apparatus that physically includes a processor 1001, a storage device 1002, an auxiliary storage device 1003, a communication device 1004, an input device 1005, an output device 1006, a bus 1007, and so forth.

Note that, below, the term "device" may be read as a circuit, a unit, or the like. The hardware configuration of a base station apparatus 100 and a user apparatus 200 may be configured to include one or more of the devices 1001-1006 illustrated, or may be configured not to include some of the devices 1001-1006 illustrated.

Each of the functions of a base station apparatus 100 and a user apparatus 200 is implemented as a result of hardware such as the processor 1001 and the storage device 1002 reading predetermined software (program) and thereby the processor 1001 performing operations to control communication by the communication device 1004 and control reading data from and/or writing data to the storage device 1002 and the auxiliary storage device 1003.

The processor 1001 controls the entirety of the computer by causing an operating system to operate, for example. The processor 1001 may include a central processing unit (CPU) that includes an interface for a peripheral device, a control device, an arithmetic device, a register, and so forth.

Further, the processor 1001 reads a program (a program code), a software module, or data from the auxiliary storage device 1003 and/or the communication device 1004 onto the storage device 1002, and thus implements various processes according to the read information. As the program, a program that causes the computer to perform at least some of the operations described above for the above-mentioned embodiment is used. For example, the transmission unit 110, the reception unit 120, the setup information management unit 130, and the initial access setup unit 140 of a base station apparatus 100 illustrated in FIG. 8 may be implemented by a control program that is stored in the storage device 1002 and operates with the processor 1001. Further, for example, the transmission unit 210, the reception unit 220, the setup information management unit 230, and the initial access control unit 240 of a user apparatus 200 illustrated in FIG. 9 may be implemented by a control program that is stored in the storage device 1002 and operates with the processor 1001. In this regard, it has been described that various processes described above are implemented by the single processor 1001. However, various processes may be implemented by two or more processors 1001 simultaneously or sequentially. The processor 1001 may be implemented by one or more chips. A program may be transmitted from a network through an electric communication line.

The storage device 1002 is a computer readable recording medium and includes, for example, at least one of a ROM (Read-Only Memory), an EPROM (Erasable Programmable ROM), an EEPROM (Electrically Erasable Programmable ROM), a RAM (Random Access Memory), and so forth. The storage device 1002 may be called a register, a cache, a main memory (a main storage), or the like. The storage device 1002 can store a program (a program code), a software module, or the like executable for implementing processes according to an embodiment of the present invention.

The auxiliary storage device 1003 is a computer readable recording medium and includes, for example, at least one of an optical disc such as a CD-ROM (Compact Disc ROM), a hard disk drive, a flexible disk, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and so forth. The auxiliary storage device 1003 may be called an auxiliary storage device. The above-described recording medium may be, for example, a suitable medium such as a database, a server, or the like that includes the storage device 1002 and/or auxiliary storage device 1003.

The communication device 1004 is hardware (a transmission and reception device) for performing communication between computers through a wired and/or wireless network and may also be called, for example, a network device, a network controller, a network card, a communication module, or the like. For example, the transmission unit 110 and the reception unit 120 of a base station apparatus 100 may be implemented by the communication device 1004. Further, the transmission unit 210 and the reception unit 220 of a user apparatus 200 may be implemented by the communication device 1004.

The input device 1005 is an input device (for example, a keyboard, a mouse, a microphone, a switch, a button, a sensor, or the like) that receives an input from the outside. The output device 1006 is an output device (for example, a display, a speaker, a LED light, or the like) that performs outputting to the outside. The input device 1005 and the output device 1006 may have an integrated configuration (for example, a touch panel).

Further, various devices such as the processor 1001 and the storage device 1002 are connected together via a bus 1007 for performing communication of information. The bus 1007 may be configured by a single bus or may be configured by different buses corresponding to various devices.

Further, each of a base station apparatus 100 and a user apparatus 200 may be configured to include hardware such as a microprocessor, a digital signal processor (DSP), an ASIC (Application Specific Integrated Circuit), a PLD (Programmable Logic Device), or a FPGA (Field Programmable Gate Array). The hardware may implement some or all of the various functional blocks. For example, the processor 1001 may be implemented by at least one of these types of hardware.

Summary of Embodiment

As described above, according to an embodiment of the present invention, a user apparatus is provided to receive an instruction to execute a random access procedure from a base station apparatus and includes a reception unit that receives information specifying an available random access channel from the base station apparatus; a control unit that identifies, on the basis of the information, a resource of the available random access in the time domain or the frequency domain channel; and a transmission unit that transmits a random access preamble using the identified resource.

By this configuration, a user apparatus 200 can identify, on the basis of a PRACH Mask Index indicated from a base station apparatus 100, a PRACH resource in the time domain or the frequency domain that can be used by the user apparatus 200 to execute a contention free random access procedure. Thus, it is possible to suitably indicate, to the user apparatus, a RACH resource to be used for a random access procedure in NR.

With respect to the identified resource in the time domain, a specified time domain granularity may differ depending on capability of the user apparatus or a frequency to be used. By this configuration, it is possible to change which granularity is used for specifying the time domain, a subframe, a slot or an OFDM symbol depending on the UE capability or a band to be used.

In the information, the user apparatus 200 may ignore a part or all of information indicating a segment in the frequency domain in a case where allocation of an individual random access channel has been already specified. By this configuration, the user apparatus 200 can use a segment in the frequency domain specified by a Dedicated PRACH with priority.

With respect to the identified resource in the frequency domain, a BWP or a SUL, in which the resource is arranged, may be identified on the basis of a sequence of indexes allocated to the BWP or the SUL. By this configuration, a user apparatus 200 can identify a BWP or a SUL where a PRACH is arranged.

A resource may be identified on the basis of a cause to trigger the random access procedure. By this configuration, it is possible to change a method to allocate a PRACH resource on the basis of a cause that triggers the random access procedure.

In addition, according to an embodiment of the present invention, a base station apparatus is provided to send an instruction to a user apparatus to cause the user apparatus to execute a random access procedure and includes a transmission unit that transmits, to the user apparatus, information specifying an available random access channel; a processing unit that identifies, on the basis of the information, a resource of the available random access channel in the time domain or the frequency domain; and a reception unit that receives a random access preamble using the identified resource.

By this configuration, a base station apparatus 100 can identify, on the basis of a PRACH Mask Index to be indicated to a user apparatus 200, a PRACH resource in the time domain or the frequency domain that the user apparatus 200 can use, and can cause the user apparatus 200 to execute a contention free random access procedure. Thus, it is possible to suitably indicate a RACH resource to be used for a random access procedure in NR to the user apparatus.

Supplement to Embodiment

Thus, one or more embodiments of the present invention has been described. However, the disclosed invention is not limited to such an embodiment of the present invention, and the person skilled in the art will understand various variants, modifications, replacements, and so forth. Although specific numerical values have been used as examples for promoting understanding of the invention, the numerical values are merely examples unless otherwise noted, and any other suitable values may be used instead. Classifications of items in the above description are not essential to the present invention, contents described in two or more items may be used in combination if necessary, and contents described in an item may be applied to contents described in another item (unless a contradiction arises). Boundaries between functional units or processing units do not necessarily correspond to boundaries of physical components. Operations of a plurality of functional units may be physically implemented by a single component and an operation of a single functional unit may be physically implemented by a plurality of components. Concerning operation procedures described above for an embodiment of the present invention, an order of steps may be changed unless a contradiction arises. For the sake of convenience for describing operations, a base station apparatus 100 and a user apparatus 200 have been described with the use of functional block diagrams. However, these apparatuses may be implemented by hardware, software, or a combination thereof. Each of software functioning with a processor of a base station apparatus 100 according to an embodiment of the present invention and software functioning with a processor of a user apparatus 200 according to an embodiment of the present invention may be stored in any suitable recording medium such as a random access memory (RAM), a flash memory, a read-only memory (ROM), an EPROM, an EEPROM, a register, a hard disk (HDD), a removable disk, a CD-ROM, a database, or a server.

Further, sending of information may be implemented not only according to an embodiment of the present invention described herein but also by another method. For example, sending of information may be implemented with the use of physical layer signaling (for example, DCI (Downlink Control Information) or UCI (Uplink Control Information)), upper layer signaling (for example, RRC (Radio Resource Control) signaling, MAC (Medium Access Control) signaling, broadcast information (a MIB (Master Information Block), or a SIB (System Information Block)), or another signal, or a combination thereof. Further, RRC signaling may be called a RRC message, and, for example, may be a RRC Connection Setup message, a RRC Connection Reconfiguration message, or the like.

Each mode for carrying out the present invention described herein may be applied to a system that uses a suitable system such as LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), or Bluetooth (registered trademark), and/or a next-generation system expanded on the basis thereof.

Concerning operation procedures, sequences, flowcharts, and so forth according to each mode for carrying out the present invention described herein, orders of steps may be changed unless a contradiction arises. For example, concerning methods described herein, various step elements are illustrated in exemplary orders and are not limited to illustrated specific orders.

Specific operations performed by a base station apparatus 100 described herein may in some cases be performed by an upper node. It is clear that various operations performed for communication with a user apparatus 200 can be performed by a base station apparatus 100 and/or another network node (for example, a MME, a S-GW or the like may be cited, but not limited thereto) in a network that includes one or more network nodes including the base station apparatus 100. In the above, description has been made for the case where the another network node is a single node as an example. However, the another network node may be a combination of a plurality of other network nodes (for example, a MME and a S-GW).

Each mode for carrying out the present invention described herein may be solely used, may be used in combination with another embodiment, or may be used in a manner of being switched with another embodiment upon implementation.

By the person skilled in the art, a user apparatus 200 may be called any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

By the person skilled in the art, a base station apparatus 100 may be called any one of a NB (NodeB), an eNB (enhanced NodeB), a gNB, a base station, and other suitable terms.

The term "to determine" used herein may mean various operations. For example, "to determine" may mean to consider having determined to have performed judging, calculating, computing, processing, deriving, investigating, looking up (for example, looking up a table, a database, or another data structure), or ascertaining, or the like. Also, "to determine" may mean to consider having determined to have performed receiving (for example, receiving information), transmitting (for example, transmitting information), inputting, outputting, or accessing (for example, accessing data in a memory), or the like. Also, "to determine" may mean to consider having determined to have performed resolving, selecting, choosing, establishing, comparing, or the like. That is, "to determine" may mean to consider having determined a certain operation.

Words "based on" or "on the basis of" used herein do not mean "based on only" or "on the basis of only" unless otherwise specified. That is, the words "based on" or "on the basis of" mean both "based on only" and "based on at least" or both "on the basis of only" and "on the basis of at least".

As long as any one of "include", "including", and variations thereof is used herein or used in the claims, this term has an intended meaning of inclusiveness in the same way as the term "comprising". Further, the term "or" used herein or used in the claims has an intended meaning of not exclusive-or.

Throughout the present disclosure, in a case where an article such as a, an, or the in English is added through a translation, the article may be of a plural form unless the context clearly indicates otherwise.

Note that, in an embodiment of the present invention, the initial access control unit 240 is one example of a control unit. The initial access setup unit 140 is one example of a setup unit. A SSB is one example of a synchronization block. A PRACH Mask Index is one example of information that specifies an available random access channel.

Thus, the present invention has been described in detail. In this regard, it is clear that the person skilled in the art understands that the present invention is not limited to an embodiment of the present invention described herein. The present invention can be implemented in a modified or changed mode without departing from the effect and the scope of the present invention determined by the descriptions of the claims. Therefore, the description herein is for an illustrative purpose and does not have any restrictive meaning for the present invention.

DESCRIPTION OF REFERENCE SIGNS

100 base station apparatus
110 transmission unit
120 reception unit
130 setup information management unit
140 initial access setup unit
200 user apparatus
210 transmission unit
220 reception unit
230 setup information management unit
240 initial access control unit
1001 processor
1002 storage device
1003 auxiliary storage device
1004 communication device
1005 input device
1006 output device

The invention claimed is:

1. A terminal comprising:
   a receiver that receives a Mask Index specifying an available transmission occasion for a random access channel, wherein the Mask Index is one of a plurality of Mask Indexes, each associated with respective types of trigger for a random access procedure;
   a processor that identifies, based on the received Mask Index among the plurality of Mask Indexes, an available random access channel resource in a time domain and a frequency domain; and
   a transmitter that transmits a random access preamble using the available random access channel resource.

2. The terminal according to claim 1, wherein the transmitter transmits the random access preamble using the identified resource in a bandwidth part.

3. A base station apparatus comprising:
   a transmitter that transmits a Mask Index specifying an available transmission occasion for a random access channel to a terminal, wherein the Mask Index is one of a plurality of Mask Indexes, each associated with respective types of trigger for a random access procedure; and
   a receiver that receives a random access preamble using an available random access channel resource, the available random access channel resource being identified by the terminal based on the received Mask Index among the plurality of Mask Indexes.

* * * * *